(12) United States Patent
Paschkes et al.

(10) Patent No.: US 10,154,077 B2
(45) Date of Patent: Dec. 11, 2018

(54) COMPUTER SYSTEM FOR NETWORK NODE REVIEW FOR ACTIONABLE ITEM

(71) Applicant: DIDiT, Inc., New York, NY (US)

(72) Inventors: David Paschkes, New York, NY (US); Mohammad Rahman, New York, NY (US); Kevin Miller, New York, NY (US)

(73) Assignee: DIDIT, INC., New York, NY (US)

( * ) Notice: Subject to any disclaimer, the term of this patent is extended or adjusted under 35 U.S.C. 154(b) by 183 days.

(21) Appl. No.: 15/131,830

(22) Filed: Apr. 18, 2016

(65) Prior Publication Data

US 2016/0308874 A1     Oct. 20, 2016

Related U.S. Application Data

(60) Provisional application No. 62/150,052, filed on Apr. 20, 2015.

(51) Int. Cl.
| | | |
|---|---|---|
| *H04L 29/06* | (2006.01) | |
| *H04L 29/08* | (2006.01) | |
| *G06F 3/0484* | (2013.01) | |
| *G06F 3/0482* | (2013.01) | |
| *G06F 17/30* | (2006.01) | |
| *G06Q 30/06* | (2012.01) | |
| *G06Q 50/00* | (2012.01) | |

(52) U.S. Cl.
CPC ........... *H04L 67/02* (2013.01); *G06F 3/0482* (2013.01); *G06F 3/04842* (2013.01); *G06F 17/3053* (2013.01); *G06Q 30/0631* (2013.01); *G06Q 50/01* (2013.01); *H04L 67/04* (2013.01); *H04L 67/306* (2013.01); *H04L 67/22* (2013.01); *H04L 67/30* (2013.01)

(58) Field of Classification Search
CPC .... G06F 21/30; G06F 3/0482; G06F 3/04842; G06F 17/3053; G06F 17/30533; H04L 67/02; H04L 67/04; H04L 67/22; H04L 67/30
USPC ...................................... 726/26–30
See application file for complete search history.

(56) References Cited

U.S. PATENT DOCUMENTS

| | | | | |
|---|---|---|---|---|
| 7,013,284 | B2 * | 3/2006 | Guyan | G06Q 10/06311 705/4 |
| 7,076,504 | B1 * | 7/2006 | Handel | G06Q 30/02 705/14.39 |
| 7,092,934 | B1 * | 8/2006 | Mahan | G06F 17/30864 |
| 8,201,228 | B2 * | 6/2012 | Hare | H04L 63/104 370/252 |
| 8,577,719 | B2 * | 11/2013 | Bainbridge | G06Q 50/22 705/7.11 |
| 2011/0071893 | A1 * | 3/2011 | Malhotra | G06Q 10/109 705/14.23 |

* cited by examiner

*Primary Examiner* — Hosuk Song
(74) *Attorney, Agent, or Firm* — Loeb & Loeb LLP

(57) ABSTRACT

The system may search network nodes for collections of actionable items which users may desire to add to their personal list. The system may operate as an extension on a user interface that searches displayed network content for actionable items which users may desire to add to their personal list which may be shared with other users.

17 Claims, 15 Drawing Sheets

FIG. 9

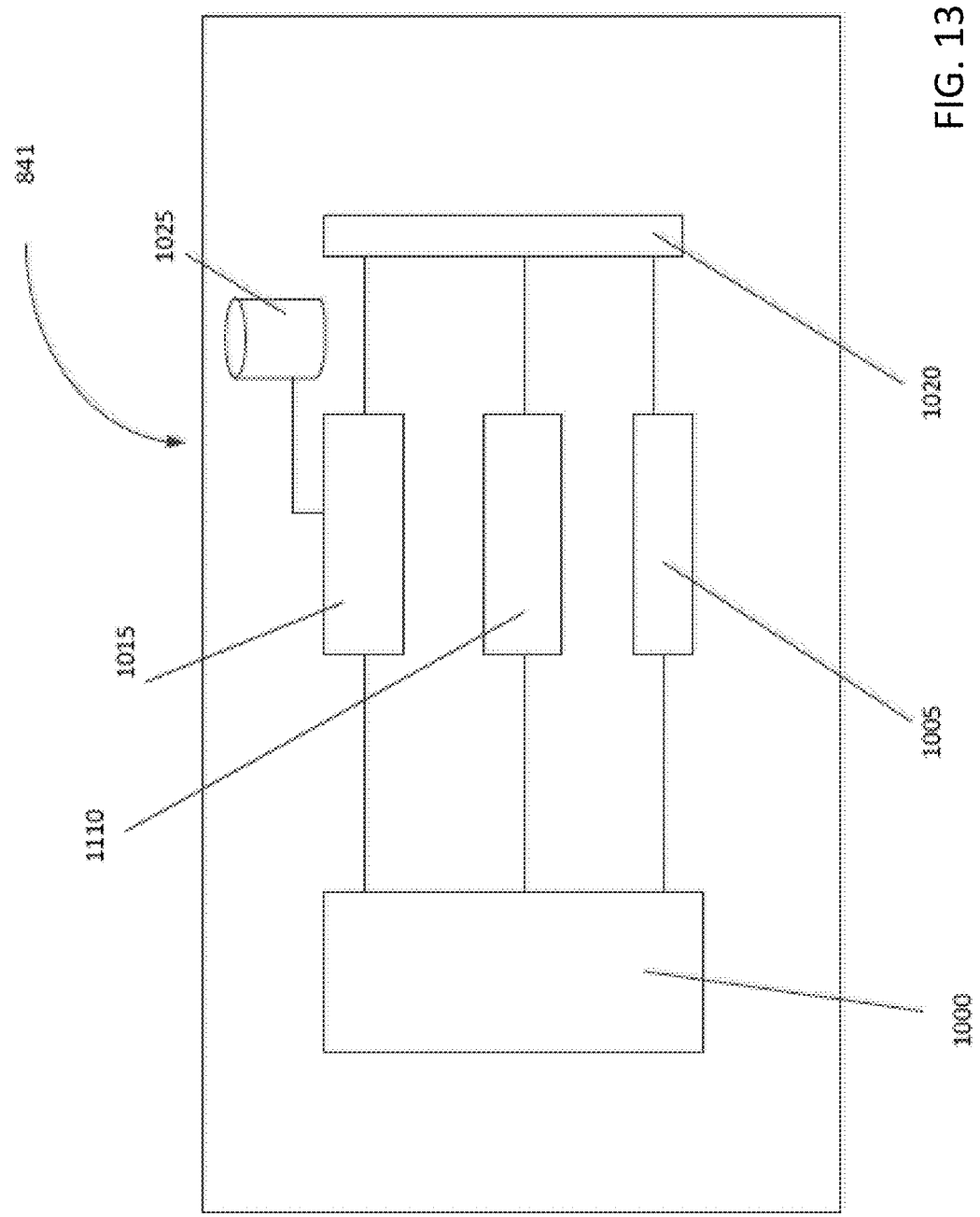

COMPUTER SYSTEM FOR NETWORK NODE REVIEW FOR ACTIONABLE ITEM

CROSS-REFERENCE TO RELATED APPLICATIONS

This application claims priority to U.S. Provisional Application No. 62/150,052, filed Apr. 20, 2015, the entirety of which is incorporated by reference herein.

BACKGROUND

Web content contains many actionable items embedded in articles, news and lists. An actionable item may include a specific content element which a user can take a specific action on. For example, a list of the top 10 burgers in New York City, an article on the best golf courses in Hawaii, a review of the newest men's sports watches, a news story on the renovations to the Cyclone at Coney Island all contain specific items a user would have interest in capturing to take action on whether it be immediately or incorporating it into a list for later. Users also have interest in capturing and tracking actionable items they have already accomplished.

SUMMARY

In one aspect, a computer system is disclosed which assists a user in creating, tracking and sharing lists of items users may want to accomplish or have accomplished. In one aspect, an extension may operate on a web site. When a user is viewing a network site that has a set of actionable items, an option may be presented for a user to add the actionable items to one or more personal lists, such as whether the actionable items have been completed, will be completed or there is no interest. Additional information may be added to the personal list such as when the actionable item will be completed, with whom, etc. The personal list data may be stored in a database and may be searchable and parsed in a variety of ways such as searching for additional users that have similar items or lists.

In another aspect, the system may search network nodes- of actionable items or collections of actionable items which users may desire to add to their personal list. Further, the system may operate as an extension on a user interface that searches displayed network content for actionable items which users may desire to add to their personal list.

BRIEF DESCRIPTION OF THE DRAWINGS

FIG. 9 is an illustration of a user interface that displays new actionable item;

FIG. 13 is an illustration of a server computing device that may be part of the system.

SPECIFICATION

At a high level, in some of the many aspects of the invention, a user may be able to review actionable items such as top ten lists and select to add the list or specific items to the user's personal list of actionable list or actionable items. The personal list or personal items may be available to be viewed by others that have sufficient permission to view the list of others. As a result, others may be able to view the list or items and select to add the list or items to their own personal list. Further, the list and items of a first user may be compared to list and items of a second user to establish that the users are correlated users. As a result, users may be able to find different and improved actionable items and experiences that the user may have never known about by reviewing the actionable items of others.

From a technical standpoint, the claimed system and method addresses several problems that currently exist. There is no way to monitor what people of interest are doing at a point in time and whether they are enjoying what they are doing. In the past, people may have read stories in a newspaper or magazine well after a person of interest has left the point of interest or finished the activity. Further, there was no way for users to indicate they had undertaken a similar task or finished a similar activity except word of mouth or diaries, and the time for the word to spread is unacceptable in today's modern world. For example, a given restaurant may have a special dish for one evening. In the past, users would miss the knowledge that the special dish was available but using the claimed system and method, the knowledge of the special dish may be spread immediately. Others may indicate they want to try the special dish immediately and this knowledge may immediately be spread through the network. Further, by using specially designed servers such as servers designed to crawl the web and search for lists, recommendations or compilations from people, a summary of specific lists may be created for others to view, consider and mark as items they would like to do using additional, specially designed servers. In the past, the automatic identification of to-do items and tracking of to-do items in a central location was not possible but with the use of specially designed servers and software as described herein, the automatic identification and tracking is now possible.

Figure 1A:
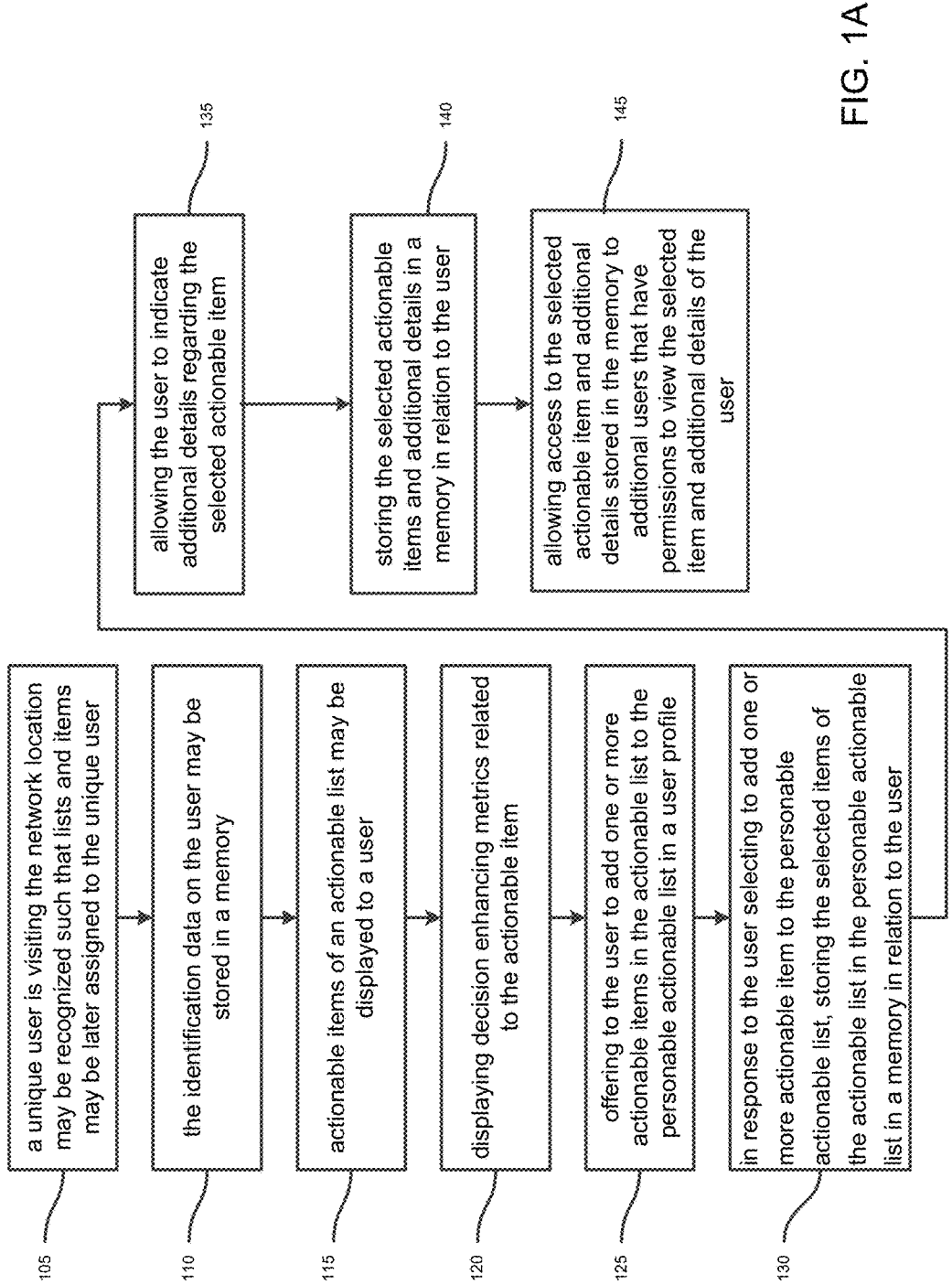
FIG. 1a is an illustration of blocks that may be performed by the processor to enable a system for reviewing actionable items.

FIG. 1a may illustrate one aspect of the many aspects of the invention such as an embeddable application that enable users to find lists and items and add those lists and items to their own list or actionable items. Of course, there are other manners of implementing the various aspects of the invention as will be further discussed in this application and would be understood from this disclosure.

Referring to FIG. 1, a computer application executing on a network location such as a web page, an application or other display that displays an actionable list with actionable content may be explained by describing the blocks of a computer executable instructions. At block 105, a unique user that is visiting the network location may be recognized such that lists and items may be later assigned to the unique user.

Recognizing a unique user is visiting the network location may be determined in a variety of ways such as receiving a user id, comparing it to a list of known ids and determining if the user id is known, using social media logins in to recognize the user, reviewing the user's computer device (with permission) for recognizable files such as cookies, etc. Of course, additional manners of recognizing individual are possible such as recognizing unique signatures from computing devices, receiving bio-identification, logging in using other logins such as social web sites, reviewing IP addresses, receiving telephone numbers, receiving portable computing device identification, etc. The hardware for recognizing a user may be a recognition server which is specifically designed for recognizing users.

At block 110, the identification data on the user may be stored in a memory such that the user may be recalled if the user returns in the future. A identification server may be physically configured and optimized to store the identification data on the users. By recalling a user, repeated information may be avoided from being displayed. In addition, if the user is recognized then only new information may be displayed or information that is related to items or lists the user has previously expressed interest may be displayed. For example, if a user has indicated that the user likes to snow ski, only new ski lists or items may be displayed. As mentioned previously, the recognition of the user may occur in a variety of ways. As an example, a user may be recognized by using a social media login, a login from another widely known login service or by reviewing a file from a previous login. In another embodiment, the user may simply log directly into the system. In other embodiments, the login may be a traditional name and password or may be biometric such as voice recognition, fingerprint recognition, etc. Other manners of establishing knowledge and trust of a user from a computing device such as accessing a secure element with permission are known and are contemplated.

At block 115, actionable items of an actionable list may be displayed to a user. The actionable list may contain items that may be of interest to some or many users. An example and not limitation is a top list. The top list may relate to a variety of things, places or services. As just an example as in FIG. 3, a possible top fifteen list is of the top 15 bars in a city. Logically, top lists can cover virtually any actionable item such as goods, services, places, vacations spots, things to do, etc., and any examples mentioned are not meant to be limiting but just examples. A actionable list server may be physically configured to store and server lists in an efficient manner.

At block 120, decision enhancing metrics related to the actionable item list may be displayed to the user. The decision enhancing metrics may be stored and served from a metrics server which may be physically configured to efficiently store and serve decision enhancing metrics. The decision enhancing metrics may include such things as how many other individuals have completed each actionable item, how many additional individuals plan to complete each actionable item, or how many of the user's correlated relationships have completed or plan to complete that actionable item. If people plan to do the item, they may be listed as "Do It" and people who have completed the item may be listed under "Did It." Further, details regarding the actionable item may be displayed such as the increase (or decrease) in how many people have indicated a desire to undertake the actionable item, the pace of the increase, the comparison of the pace to the pace of other actionable items, etc.

If the user signed in using a social media platform or provided other manners of identification, the friends of the user may be known or accessed through the social media or another network such as a purpose built network to track actionable items. The display of decision enhancing metrics may highlight friends that also have expressed interest in the actionable item. For example, referring to FIG. 3, an image of a known friend from a social media web site may be displayed under the Do It tab if the friend has indicated they desire to complete the actionable item. Similarly, if the user provides permission, contacts of the user may be reviewed to see if any of the contacts have previously expressed interest in any of the actionable items.

In some embodiments, a profile for users of the system may be created and stored in a memory, such as in a profile server which is physically configured to efficiently store and serve profiles. As an example, if a user has indicated interest in a number of actionable items related to climbing mountains, the profile may use an algorithm to recognize that the user has an interest in mountain climbing. In simpler embodiments, the actionable items may simply be kept in a memory related to the users. The profile may be used to find similar users and the similar users may be displayed. As an example, if a first user has expressed interest in several mountain climbing actionable items (top ten lists) and a second user has expressed a similar interest in the same mountain climbing actionable items, a correlation between the first and second user may be over a threshold and the system may note that it would be logical to connect the first user and the second user.

Figure 3:
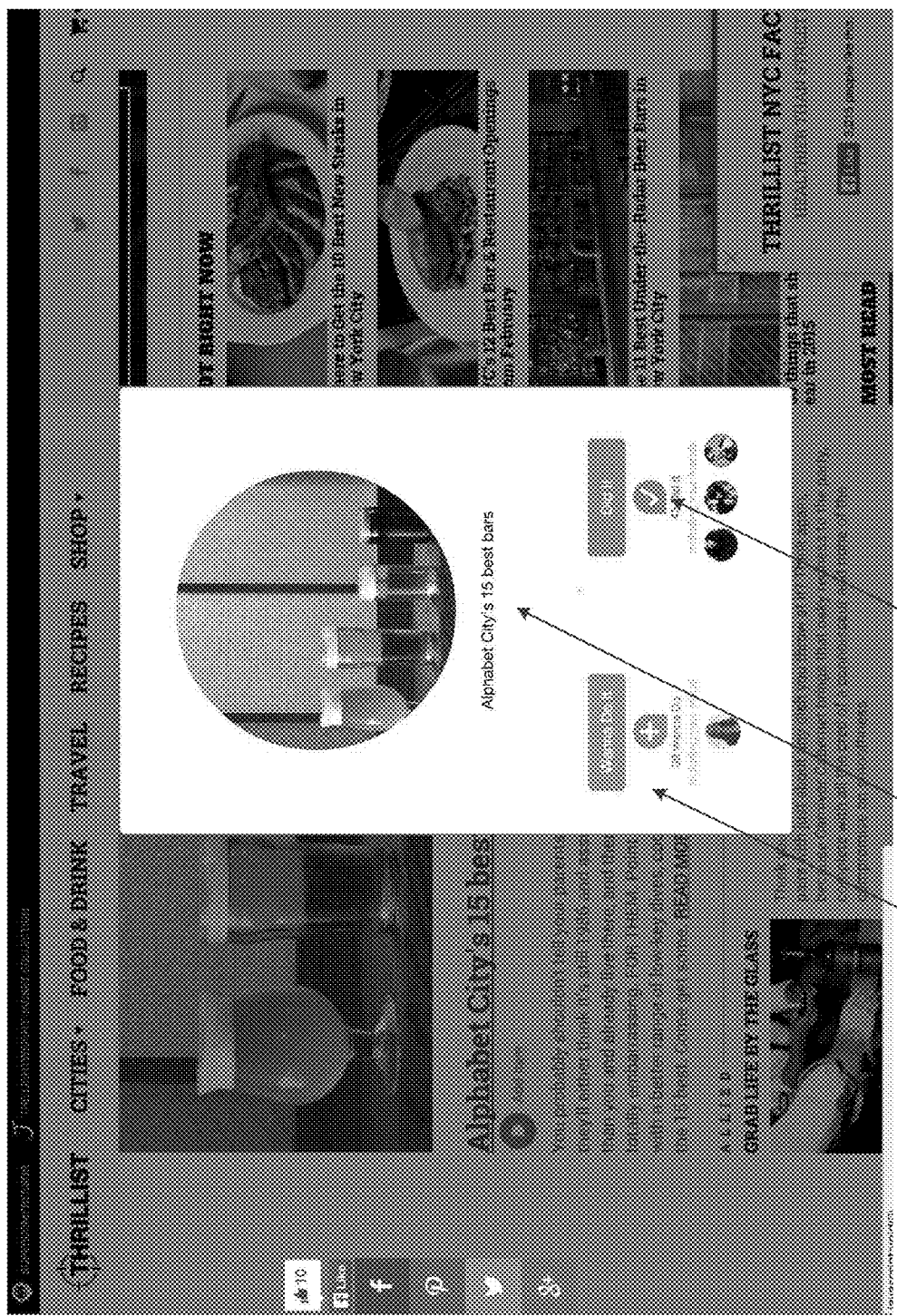
FIG. 3 is a sample display of FIG. 2 with an application that highlights selectable items.

The connection between the first and second user may occur by simply displaying the second user to the first user when an actionable item for the first user is located as in FIG. 3. In other embodiments, a separate application may access the interest of the user in an actionable item and may apply algorithms to attempt to create groups or match users with similar interest in actionable items. Algorithms may be useful as interests of a user may be analyzed to make suggestions to a user that additional actionable items may be of interest. For example, a user that likes mountain climbing may also like hang gliding. Further the user may be interested in meeting people that may like hang gliding.

In one embodiment, determining correlated relationships may include analyzing the additional item and additional detail for the individuals, determining if the addition item and additional detail for the individual are over a similarity threshold of an additional user and in response to determining that that additional item and additional detail for the individual are over a similarity threshold of an additional user, storing that the users are correlated users. The correlation may occur using a correlation server which may be physically configured according to the correlation algorithms to efficiently determine and server correlations as needed. The similarity threshold may be preset or may be adjusted by an administrator or by a user. In some embodiments, the similarities in the similarity index may be set high, such as two users having interest in the same actionable items. In other embodiments, the similarity index may be lower with the interest of the two users being similar but not exact. Additional methods to determine correlated users are possible and are contemplated.

On the back end, the system may keep the interest data in a database in an interest server, for example, and the data may be reviewed and parsed in a variety of ways. For example, in FIG. 5, a user interface for a back end user such as an administrator may be illustrated where collections of interest items may be stored. The data in the database may be sorted and reviewed in a variety of ways including how many a times a list has been used, the source of a list, the publishers of a list and the categories to which a list may belong. The categories may be preset by the back end or may be determined by an algorithm that analyzes the data and determines logical categories based on the data.

Logically, the lists may not exist in a form that is immediately useable by the system. The lists may need to be created. As will be explained in reference to FIGS. 1*b* and 1*c*, another aspect of the back end system may be to search nodes on available networks for lists.

Referring again to FIG. 1*a*, at block 125, a user may be offered to add one or more actionable items in the actionable list to the personable actionable list in a user profile. FIG. 3 may be an illustration of actionable items being offered to be added to a user profile. At block 130, in response to the user selecting to add one or more actionable item to the personable actionable list, the selected items of the actionable list in the personable actionable list may be stored in a memory in relation to the user such as in the profile server.

At block 135, the user may be permitted to indicate additional details regarding the selected actionable item which may be served from an actionable item server. The additional items may include indicating that a user wants to do it, plans to do it, does not want to do it or did it already or the like. In addition, a user may add when a selected item was completed or will be completed, with whom a selected item was completed or will be completed and a rating of the selected item. In some embodiments, it may be logical if the actionable items of an actionable list are related to the content on the network display. Further, the actionable items may include a distinct experience items that may be visited, purchased, or otherwise completed either immediately or at a later date.

At block 140, the selected actionable items and additional details may be stored in a memory in relation to the user such as in the identification server or profile server. The updates to additional items may be completed in real time and the updates to items may be displayed in real-time. As will be explained in regard to FIGS. 4-9, the items may be stored in a database which may be indexed and searched in a variety of ways.

At block 145, additional users that have permissions may be allowed to access selected actionable items such as from the actionable item server and additional details stored in the memory such is in the identification server or profile server to view the selected item and additional details of the user. For example, a user may allow contacts from a social network to view items that the user has marked as being of interest, including the additional information of whether someone plans to complete an item in the future. In addition, the system itself may access the database of information and determine relevant information that may be of interest to users such as the number of users that have added the actionable item in the last 24 hours, the rate of increase of adding the actionable item, the ranking of the selected actionable item to other actionable items, etc.

Users can add entire actionable item lists or specific items from an actionable item list. For example, a mountain climber may have already climbed 9 of the 10 highest peaks in North America so it would not be logical to add the entire list as a "Do It" but it would be logical to add the 1 remaining mountain as a "Do It." Similarly, the mountain climber may not have played many golf courses and may want to add an entire list of great golf courses in North American to his/her "Do It" list.

In some embodiments, a change in status from "Do it" to "Plan to do it" may result in the execution of some additional computer instructions which may be located on additional servers to make it easier for a user to actually plan to do something. For example, if a user changes from "Do it" to "Plan to do it" for a trip to Coney Island, a variety of options may be presented to the user to make the planning easier. For example, a user may be able to buy tickets in advance. Further, the user may be able to buy transit tickets to get to Coney Island, maybe able to see a map of how to get to Coney Island, may be able to purchase reserve seats to events at Coney Island, etc. Further, the user may be presented with an option to purchase the entire experience from airlines, transportation to a hotel, transportation to Coney Island, tickets, reservations at events and the reverse trip home.

In some embodiments, the change in status from "plan to do it" to "DIDiT" may also create additional options for a user to give feedback on what s/he did. For example, a user may be able to rate the experience of the various aspects of the experience such as that a user loved the Cyclone at Coney Island but did not enjoy the subway ride to Coney Island. The reviews may be stored in the profile server or in a separate feedback server. Other users may be able to view the reviews or comments and may adjust their plans based on the reviews. Further, the reviews may be able to be pushed to social media sites or other network nodes. Similarly, other changes in status of items may result in the solicitation for feedback regarding the change.

Figure 1B:
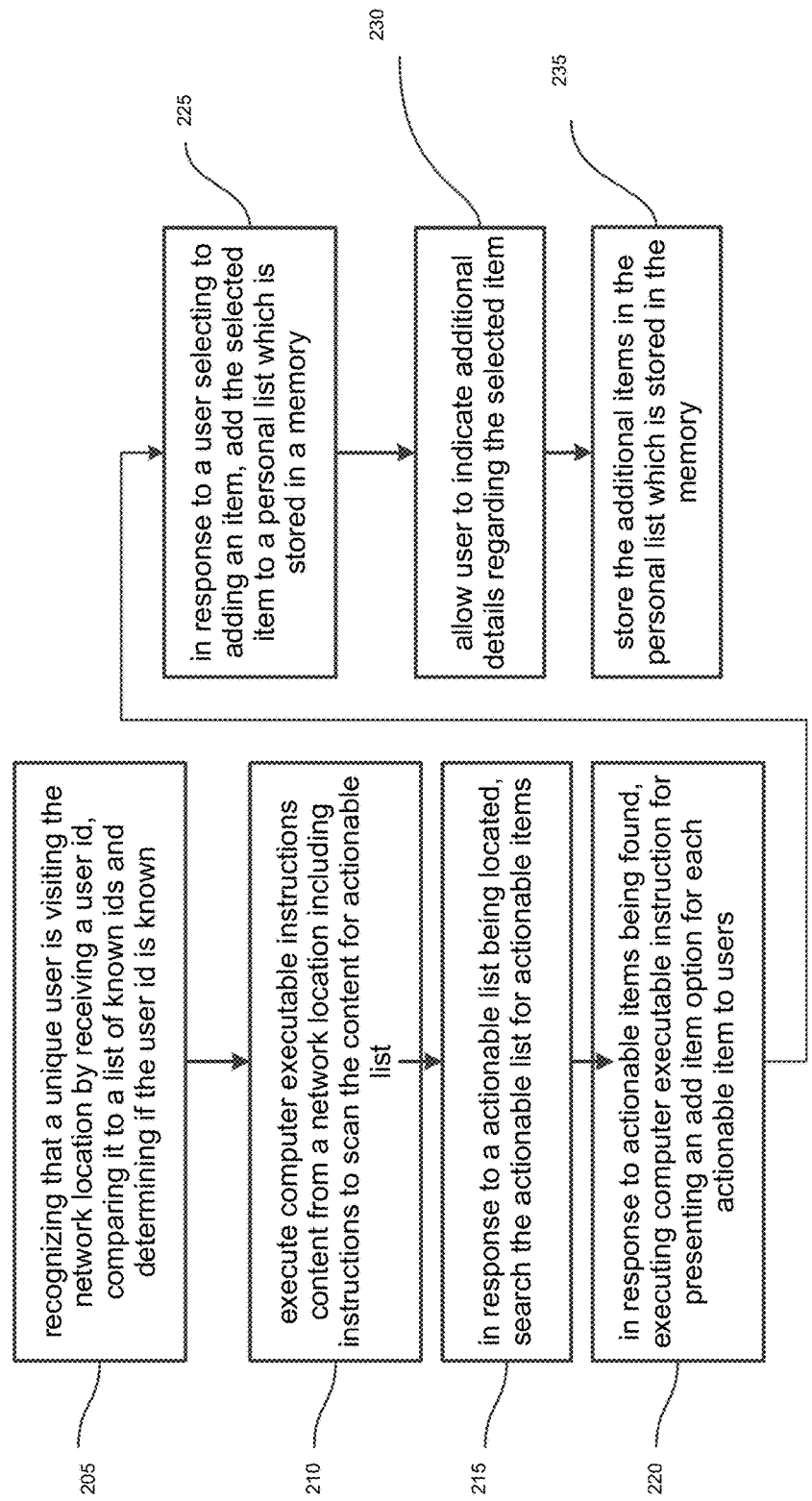
FIG. 1b is an illustration of blocks that may be performed by the processor to enable a system for reviewing actionable items.

FIG. 1*b* may illustrate another aspect of the system. In some embodiments, the system may operate as a browser extension that recognizes lists and provides user the functionality of indicating interests in total list and for individual items. It also may operate as an application on a mobile device, etc.

At block 205, the application may recognize that a unique user may be visiting the network location in a variety of ways. As mentioned previously, in some embodiments, a user may sign in using a user id and password and in other embodiments, the sign in from another service may be used, such as a social network or email service. In addition, cookies may be used to automatically sign in a user. The user information may be compared to a list of known ids/users and the application may determine if the user is known.

At block 210, content from a network location may be reviewed to determine if actionable list is present. Common terms may be used to obtain the desired content such as "Top Ten", "Top Twenty", "Top 10", "Best of", "Leaders", "List", "to do", etc. Further, the text of the content may be reviewed to see if the content is comparable to content from other known actionable lists. An algorithm also may be used review the content of the network location to determine if the network location contains an actionable list or whether the network location may need further review to make a final determination. The actionable items may include a distinct experience or items that can be at least one of visited, purchased, or otherwise completed either immediately or at a later date.

At block 215, in response to an actionable list being located, the actionable list may be searched for actionable items which have been described previously. In some network locations, this may include following a sequential number of links as each element of the top ten list may have its own network location. At block 220, in response to actionable items being found, an add item option may be presented for each actionable item or for the entire list to users.

At block 225, in response to a user selecting to adding an item, the selected item may be added to a personal list which is stored in a memory. As mentioned previously, a back end system such as cloud storage or remote servers may be used to store and analyze the personal lists. At block 230, the user may be allowed to indicate additional details regarding the selected item. As mentioned previously, the additional items may include Want to do it, Plan to do it, Do not want to do it, Skip It and Did it. In addition, additional items may include when a selected item was completed or will be completed, with whom a selected item was completed or will be completed and a rating of the selected item. The actionable items of an actionable list may be related to the content on the network display. Additional details may also include how many other individuals have completed each actionable item, how many additional individuals plan to complete each actionable item, or how many of their correlated relationships have completed or plan to complete that actionable item. Further statistics may be used to list the actionable items that are increasing in popularity the fastest, have the most followers, have the biggest difference is want to do it and not want to do it, etc. Other factors may be of interest to users such as whether an item is on sale, whether there is a short term deal, whether there are a limited number of items or whether even more exclusive opportunities may exist related to the item.

At block 235, the additional items in the personal list may be stored in the memory. The updates to items may be displayed in real-time and updates to additional items may be completed in real time. For example, if a friend indicates they plan to play the ten best golf courses in the US, this change may be noted on the user interface of additional friends virtually immediately as the data in the backend may be updated and pushed to users. As previously mentioned, the selected item and additional details stored in the memory may be available to additional users that have permissions to view the selected item and additional details of the user.

Figure 1C:
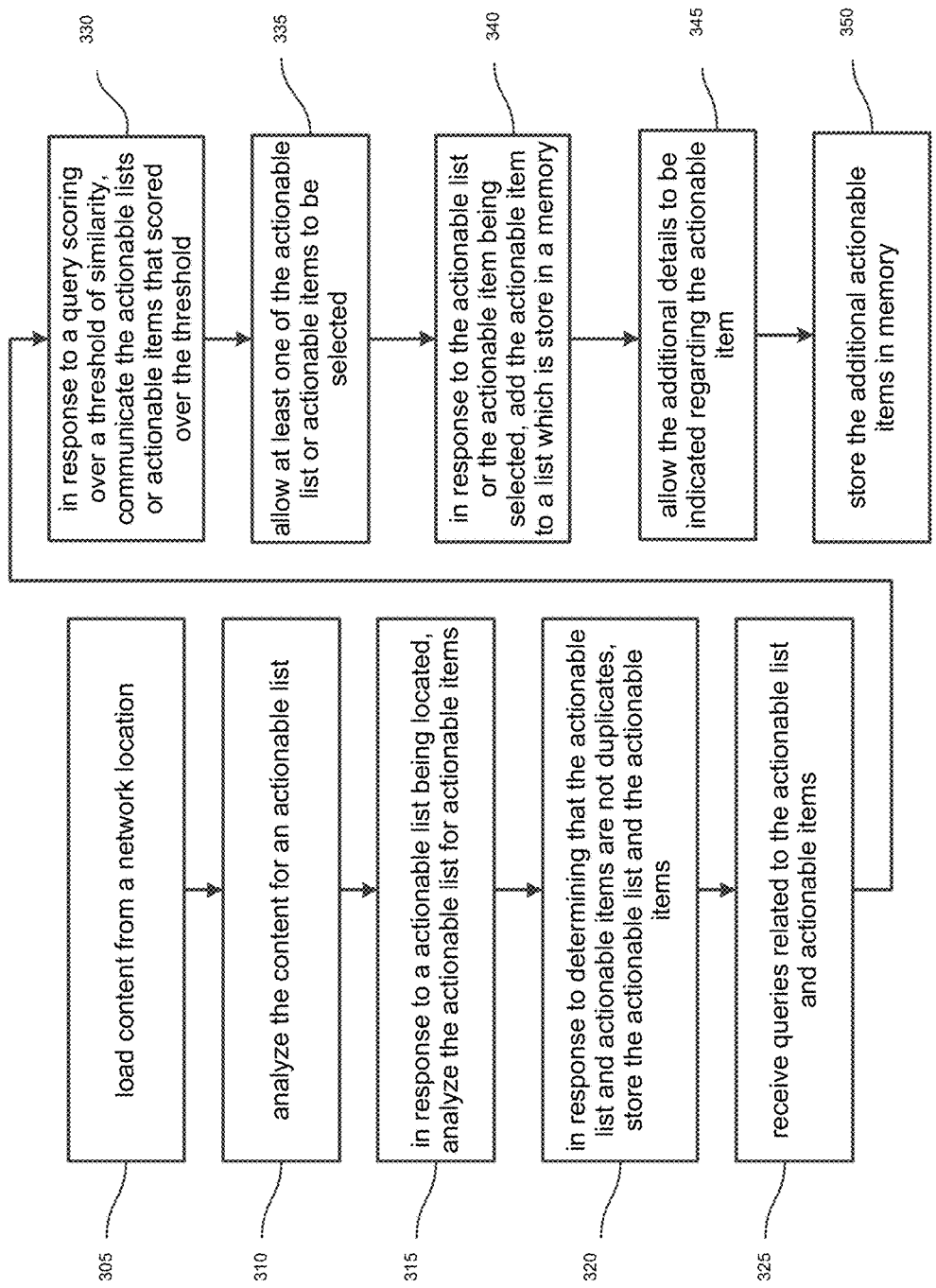
FIG. 1c is an illustration of blocks that may be performed by the processor to enable a system for reviewing actionable items.

FIG. 1c may illustrate another aspect of the system, specifically the back end system. The system may crawl or review a network such as the Internet or World Wide Web and look for syntax and key words that indicate the content is a list of actionable items and pulls the data. Further, an algorithm may be used to review the data for the existence of actionable lists and actionable items.

In some embodiments, the system may search for specific actionable item lists. A user can request key words for lists. For example, a user may request to see actionable items related to mountain climbing and the algorithm may search for actionable lists and items related to mountain climbing. Further, if a list of items are found, the engine may push the list into the application for action later.

At block 305, content may be loaded from a network location such a web page such that is may be further analyzed. At block 310, the content may be reviewed for an actionable list. As mentioned previously, the content may be reviewed for key words or phrases or may be compared to known actionable list sites to determine if an actionable list is present. An actionable item may include a distinct experience items that can be at least one of visited, purchased, or otherwise completed either immediately or at a later date. As mentioned previously, actionable items may include want to do it, plan to do it, do not want to do it and did it.

At block 315, in response to an actionable list being located, the actionable list may be analyzed for actionable items that make up actionable list. The additional actionable items may include when a selected actionable item was completed or will be completed, with whom a selected actionable item was completed or will be completed and a rating of the selected actionable item.

At block 320, in response to determining that the actionable list and actionable items are not duplicates, the actionable list and the actionable items may be stored in a memory. Logically, the additional actionable items may be stored in a memory for a specific user.

A unique user visiting the network location may be recognized by receiving a user id, comparing it to a list of known ids and determining if the user id is known as described previously. As previously mentioned, there may be a variety of ways for recognizing users, such as login, cookies, social network logins, biometric data, etc.

At block 325, queries may be received related to the actionable list and actionable items. In some embodiments, the ability to add actionable lists may appear when visiting a web site, such as a mountain climbing web site. In another aspect, user may be able to query the system for previously located actionable lists and items. For example, there may be a plurality of web sites that list top mountain climbs but the perspective of the sites may vary. For example, one web site may be focused on seniors and another may be focused on families while yet another may be focused on world class climbers. A user may query to find the most appropriate web site for the specific user. A separate query server may be created to handle queries and the query server may interface with the other appropriate servers such as the profile server.

At block 330, in response to a query being scoring over a threshold of similarity, the actionable lists or actionable items may be communicated that scored over the threshold. The selected item and additional details may be stored in the memory and may be available to additional users that have permissions to view the selected item and additional details of the user.

At block 335, at least one of the actionable list or actionable items may be allowed to be selected to be added to a personal collection or list. Further, the selection may be "do it", "did it", "do not want to do it" etc. At block 340, in response to the actionable list or the actionable item being selected, the actionable item may be added to an appropriate list ("do it" as opposed to "not interested" or "skip") which is stored in a memory.

At block 345, the additional details may be allowed to be indicated regarding the actionable item such how many other individuals have completed each actionable item, how many additional individuals plan to complete each actionable item, or how many of their correlated relationships have completed or plan to complete that actionable item. Further, relevant statistics may be displayed such as the growth in adding the list or items, etc. At block 350, the additional actionable items may be stored in memory. The updates to actionable items may be displayed in real-time and updates to additional actionable items may be completed in real time.

In the memory, correlated relationships may be determined by analyzing the additional actionable item and additional detail for the individuals, determining if the addition actionable item and additional detail for the individual are over a similarity threshold of an additional user and in response to determining that that addition actionable item and additional detail for the individual are over a similarity threshold of an additional user, storing that the users are correlated users.

In yet another aspect, some people may be thought of as having more desirable or interesting actionable lists than others. For example, a professional athlete or television star may have a very desirable actionable list to many people. The actionable lists of those deemed desirable may be given a ranking and the higher ranking, the more prominent the actionable list may be. For example, there may be a "power ranking" of actionable items lists based on the number of additional users that have selected to view, follow, respond or comment on the list. The higher the power ranking, the more prominent the item, may be displayed or the more likely the individual may appear in response to a search. The power ranking may be determined using a ranking server which may be specifically configured to determine power rankings using an algorithm that is physically configured into the processor in the server.

The "power ranking" may be created in a variety of ways and using a variety of algorithms which may be used to physically configure a ranking server. In some embodiments, a cumulative number of views may result in a high power ranking. In another embodiment, the increase in views during a period of time may be used to create the power ranking. The power ranking also may be in categories. For example, a category may be New York Restaurants and the power rankings may relate to the people watched who are heavily involved in New York restaurants.

Figure 2:
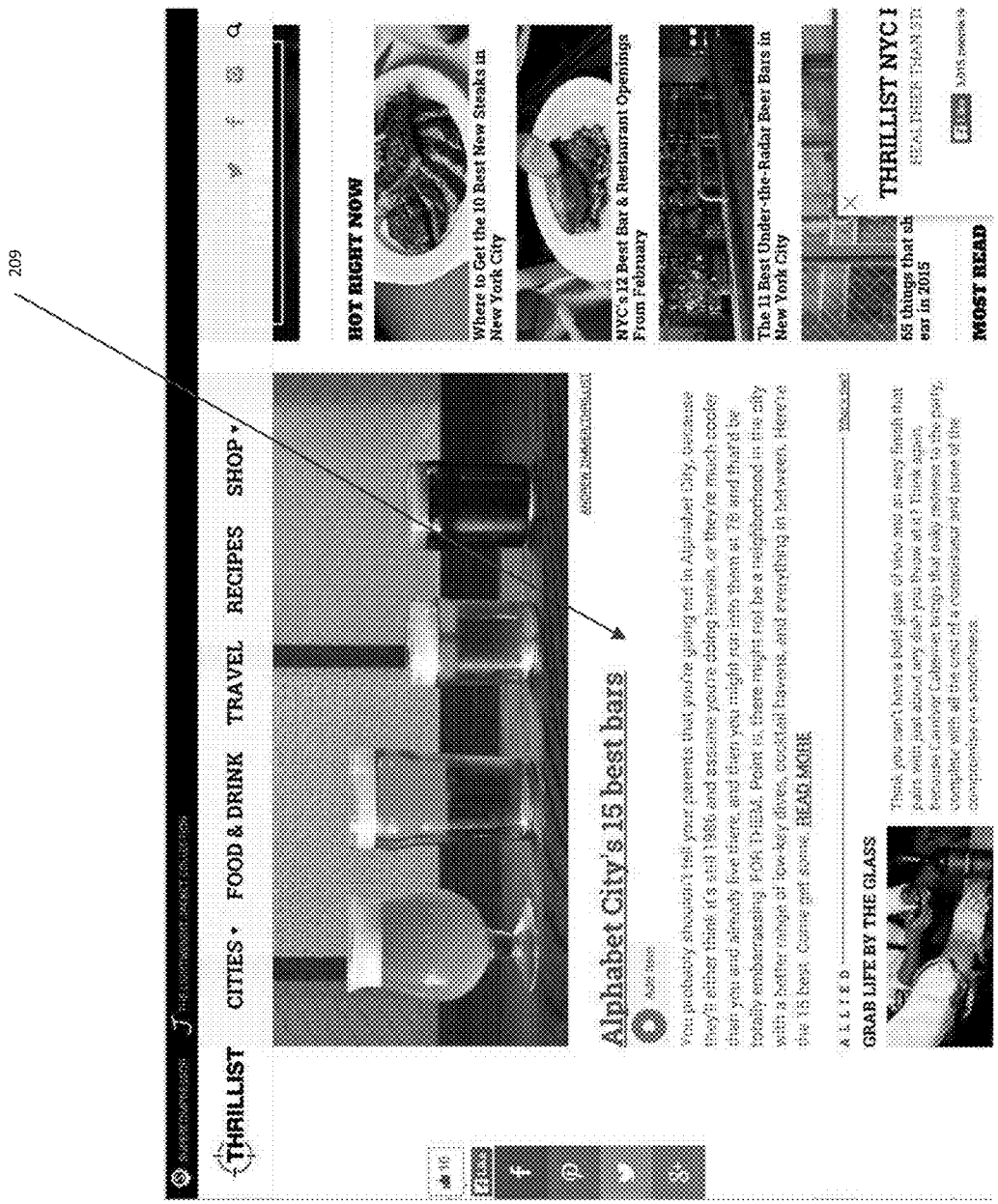
FIG. 2 is a sample display with actionable items.

Logically, web crawlers operating on specifically designed web crawler servers also may be used to assist in creating power rankings. If a user has numerous postings related to restaurants in New York, the user may be considered a New York Foodie and the account may be given a high power ranking in the area of food in New York. In this aspect, users may be recognized as being skilled in an area while the user may make little or no effort to be recognized as being skilled. FIG. 2 may illustrate a web page 209 that has a link to the 15 best bars in a city which may be useful for a DIDiT list. FIG. 3 may show that the link has been selected and additional display 309 is created and a user is presented the option to indicate they DIDiT 319 or Wanna Do It 329.

Similarly, experts in a given field may have actionable item lists that may be of heightened interest to certain members of the user community. For example, if a user is interested in mountain climbing, a person that is a known expert in mountain climbing may have a more useful list of actionable items than someone that is not heavily involved in mountain climbing. Logically, if a user is seeking new challenges related to mountain climbing, it makes more sense to find new challenges from someone considered an expert in mountain climbing than from someone not known for mountain climbing expertise.

Experts also may be determined in a variety of ways. In one embodiment, experts may be identified from previous accomplishments and may be asked to be part of the system. The expert may then create their own list of things they have done and want to do. In another embodiment, experts (or those with respected knowledge in an area) may be identified from social media postings such as photos, postings, shared articles, tweets, etc., using an expert selection server specifically built for this purpose and from those social media postings, items that have been done may be identified and listed as being part of a "DIDiT" list. In yet another aspect, experts may be identified by the number of users selecting to want to do things on the experts' "DIDiT" list. Of course, all these aspects may be combined, weighted and used to create lists of experts or power rankings.

Feedback may also be used to determine power rankings and who is an expert such that the best DIDiT lists are seen by more people. For example, if a person has a DIDiT list of amazing but relatively unknown restaurants, the feedback for that person may be very high and the person's power ranking and status as an expert may increase. At the same time, a person that is well known may have a DIDiT list that does not receive positive feedback and the power ranking and expert status for the well-known person may fall.

In some embodiments, DIDiT lists or want to Do It lists may be "pulled" from the system by visiting the site and reviewing the lists. In other embodiments, the DIDiT or WantToDoit lists may be "pushed" to a user using a communication server specifically configured to receive communication addresses, communication interests and any other relevant communication data such as preferred frequency, etc. As an example, a user may request to receive (or be pushed) restaurant "DIDiT" updates from any experts in New York automatically on a weekly basis.

Figure 4:
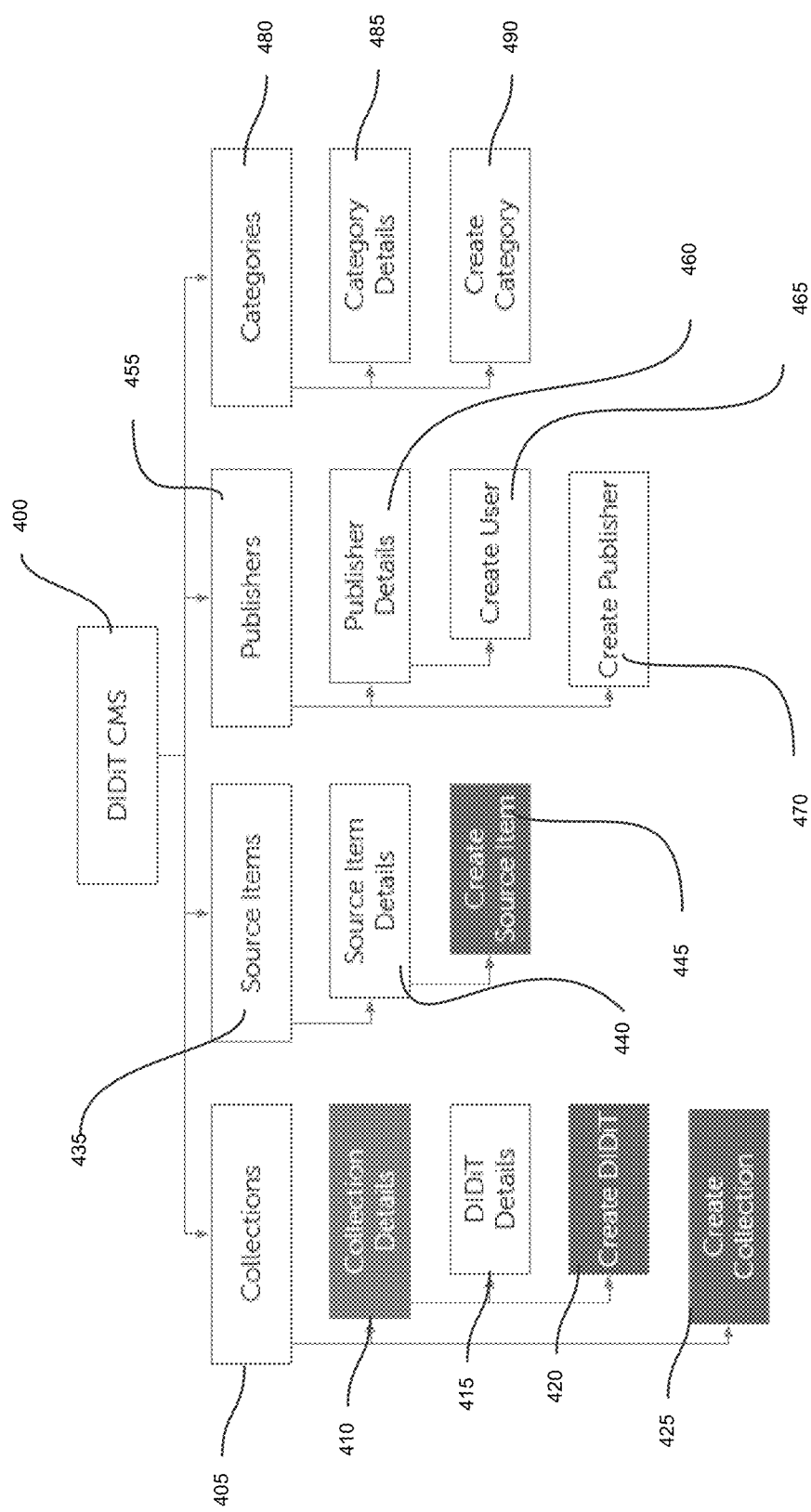
FIG. 4 is an illustration of elements that may be part of the system.
Figure 9:
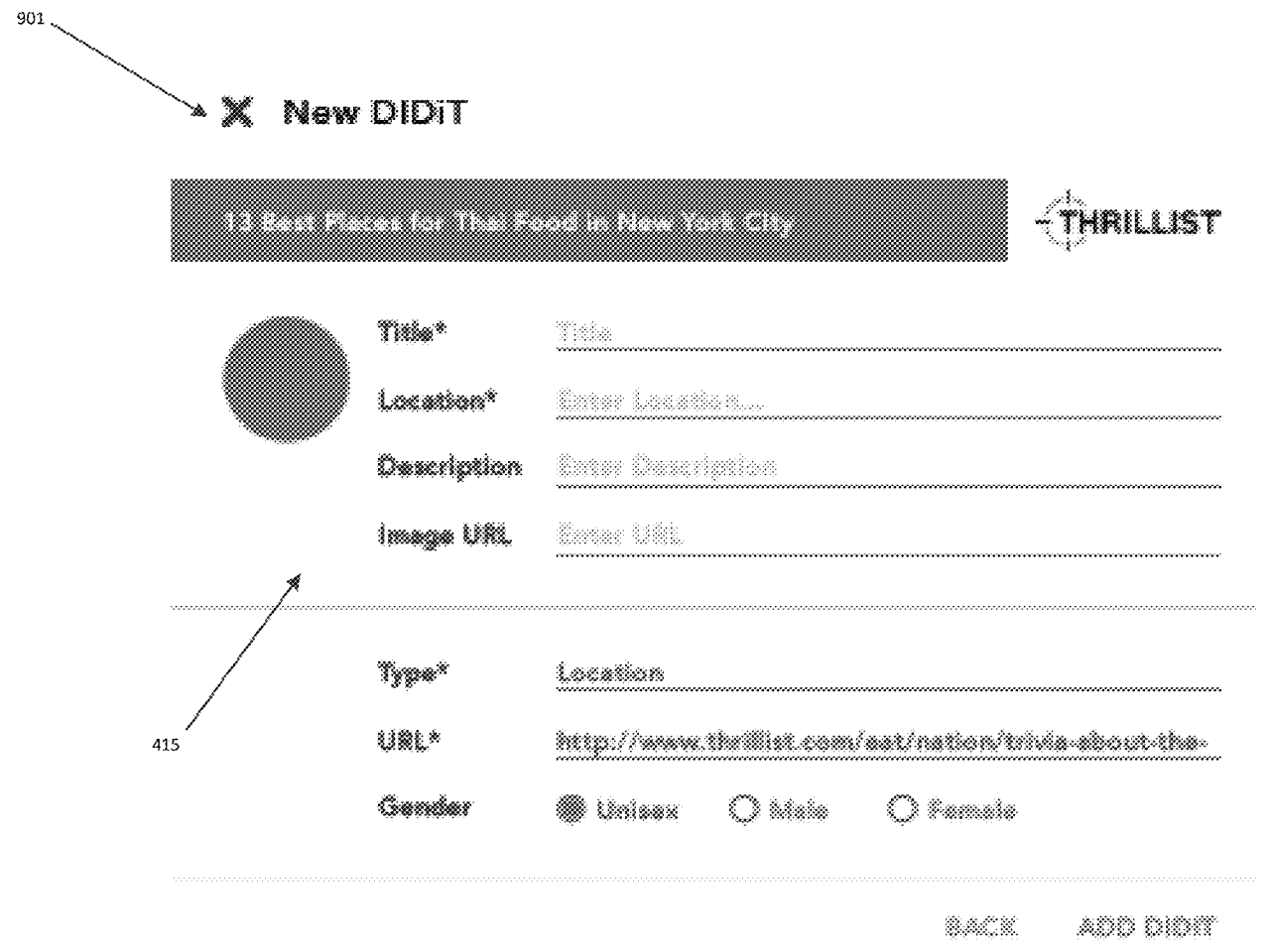

FIG. 4 may illustrate some of the elements of the content management system 400. One aspect may be collections 405 of actionable items, such as details 410 of the actionable items and details regarding the creation of the actionable items or DIDiTs that have already occurred 415. Collections 405 may include collection details 410 that include DIDiT details 415 and functions to create additional DIDiTs 420 as illustrated in FIG. 9. The DIDiTs may have a variety of details and the details may be used to help classify the DIDiT.

Figure 5:
FIG. 5 is an illustration of a user interface for one embodiment of the system.
Figure 6:
FIG. 6 is an illustration of a collections of actionable items.
Figure 7:
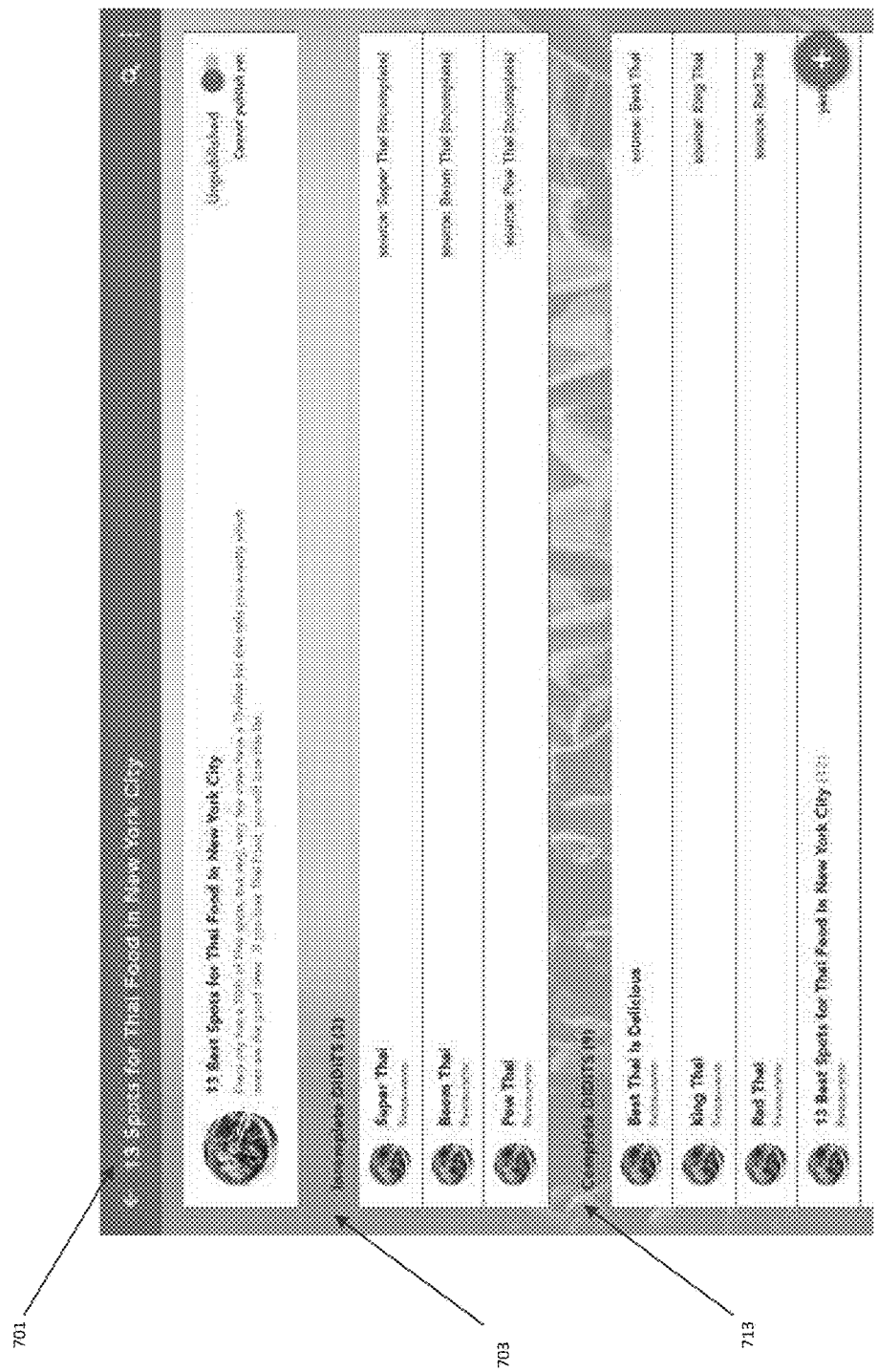
FIG. 7 is a user interface that indicates whether some actionable items have been completed and whether some actionable items have not been completed.
Figure 8:
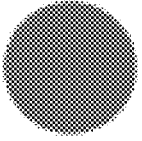
FIG. 8 is an illustration of a user interface that displays a new collection of actionable items.

DIDiTs may be part of the collections and a user may be able to create additional collections as illustrated in FIG. 8 through the backend or through another user interface. The collection may include some of the details in a collection and whether the inspiration or desire to undertake the collection 435. FIG. 5 may be an interface 501 created by an interface server illustrating available collections 505 in a content management system 400. FIG. 6 illustrates that some collections may be unpublished 603 such as collections that have not been verified or that do not have enough entries and that other collections may be published 613. FIG. 7 may illustrate a listing of DIDiTs that are complete 703 and DIDiTs 713 that are incomplete.

Figure 10:
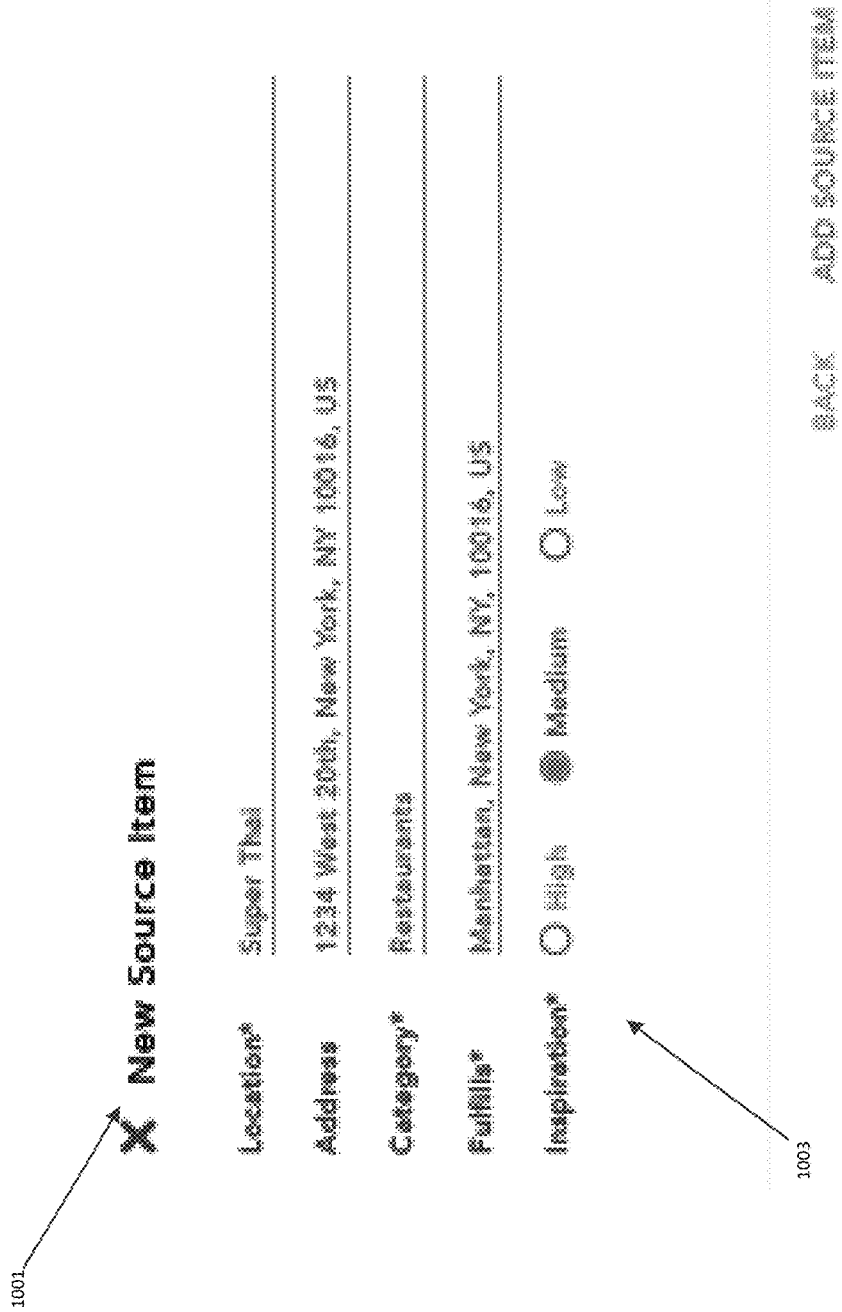
FIG. 10 is an illustration of a user interface that displays a new source for an actionable item.

The elements may also include source items 435. Details 440 may be stored regarding the source item and an option may be available to create a source item 445, either through the backend system or through a user interface 1001 such as illustrated in FIG. 10. Source items 435 may include data 1003 used to create DIDiT or WantToDoit lists such as location, address, category, articles, social media postings, or other sources of lists that users may want to follow.

Publishers 455 also may be an aspect of the content and may include publisher details 460 and whether a user 465 has been created that is related to the publisher. Further, a new publisher 470 may be created either through the back end system or through another user interface. Publishers 435 may include data aggregation sites like topical web sites, social media sites, magazine web sites, newspapers, ratings sites, etc. which may be searched to find data that may be useful for DIDiT and WantToDoit lists.

In yet another aspect, categories 480 may be part of the content management system 400. The category data may include category details 485 and the ability to create categories 490 either through the back end system or through a user interface. The categories also may be user created where a user selects key words and a classification server pushes DIDiT items or WantToDoit items into the categories based on the keywords being included in the DIDiT items or WantToDoit items.

The content management system 400 may be part of a database and may expand over time to include additional details. Further, the assignment into categories, sources, publishers and collections may have a default value but may be modified over time. Further, the assignment into various categories, for example, may have a feedback algorithm that reviews initial classifications, revised classifications and learns from mistaken and accurate classifications.

FIG. 5 may illustrate collections of elements. The collection display may allow a user, such as an administrator, to review how many times a selectable item has been accessed by users of the system. In some embodiments, a + sign may be used to allow more items to be added to the collection. Related, FIG. 6 may illustrate a user interface 601 for collections which are published and collections which are not published. The collections may be rotated over time to keep content fresh and to ensure users are able to experience continuously changing content. Also related, FIG. 7 may illustrate a user interface 701 which illustrates tasks which have been complete and tasks which have not been completed for a user and whether the information is publically available. Such displays may be useful to an administrator when determining whether content is of interest to users or is being ignored. The review of the displays may be controlled by an algorithm and may be modified by the administrators. Further, the review of the displays may be used to rotate in content of interest to users and rotate out content which is being ignored and such rotation may be controlled automatically by an algorithm FIG. 8 may illustrate a back end system of adding a new collection through a user interface 801 by adding details 803 such as title, type, publisher, description, image URL, URL, etc. There may be one or more fields which may be used to control the display of the collection to users, such as the description, the URL for an image, the URL for the collection, the publisher, the type, etc. There also may be an indication of whether inspiration for the collection is considered high, medium or low. FIG. 9 may illustrate a back end way to add a new experience to the system through a user interface 901 by adding details 903 to a new DIDiT such as title, location, description, URL, etc. Similarly, the user interface may allow the addition of a title, a location, a description, an image URL, a type, a URL and an intended gender. FIG. 10 may illustrate adding a new source item to the system. I also may contain a location, an address, a category, a fulfill location and an inspiration level for a user.

Figure 11:
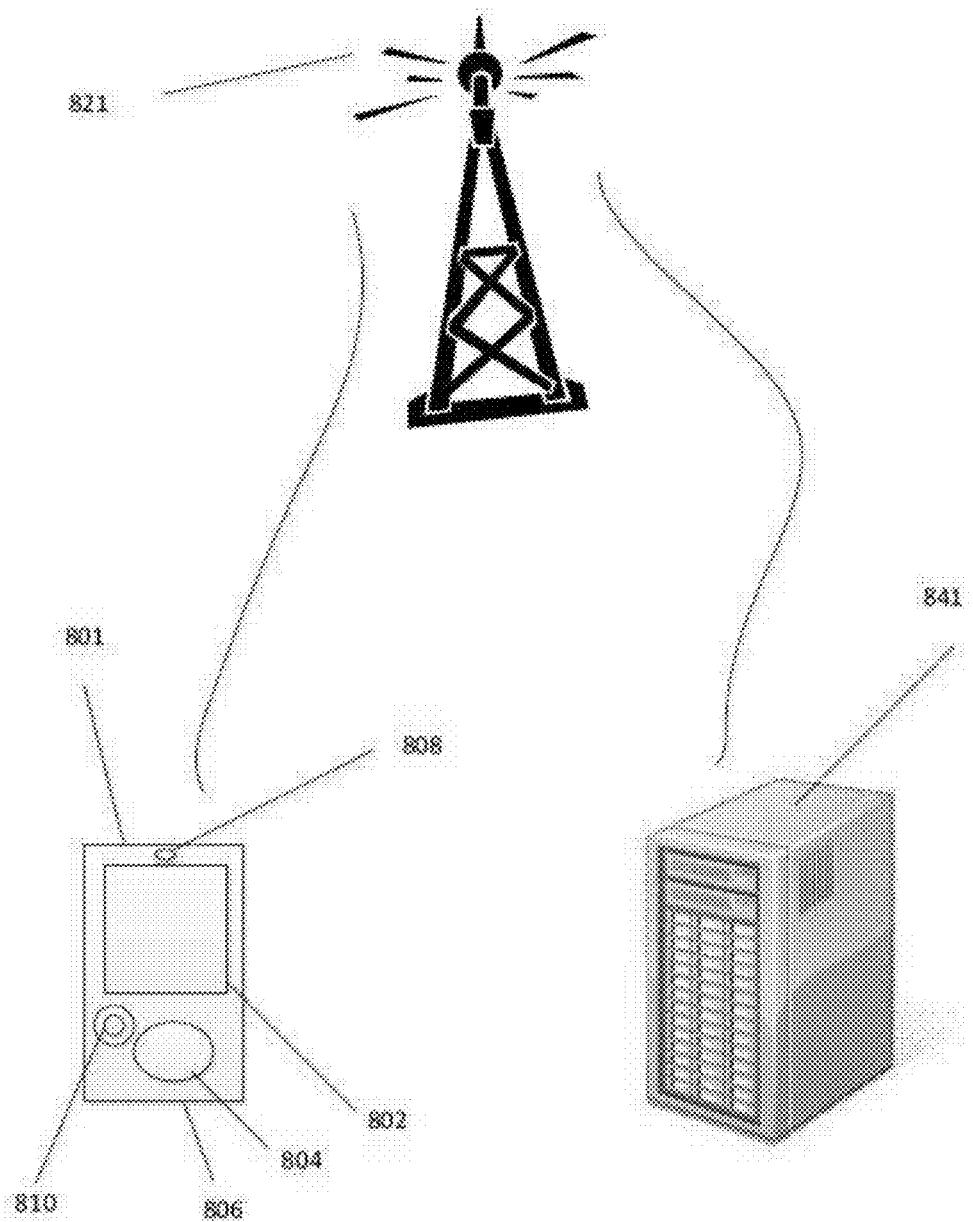
FIG. 11 is an illustration of the computing elements that may be part of the system.
Figure 12:
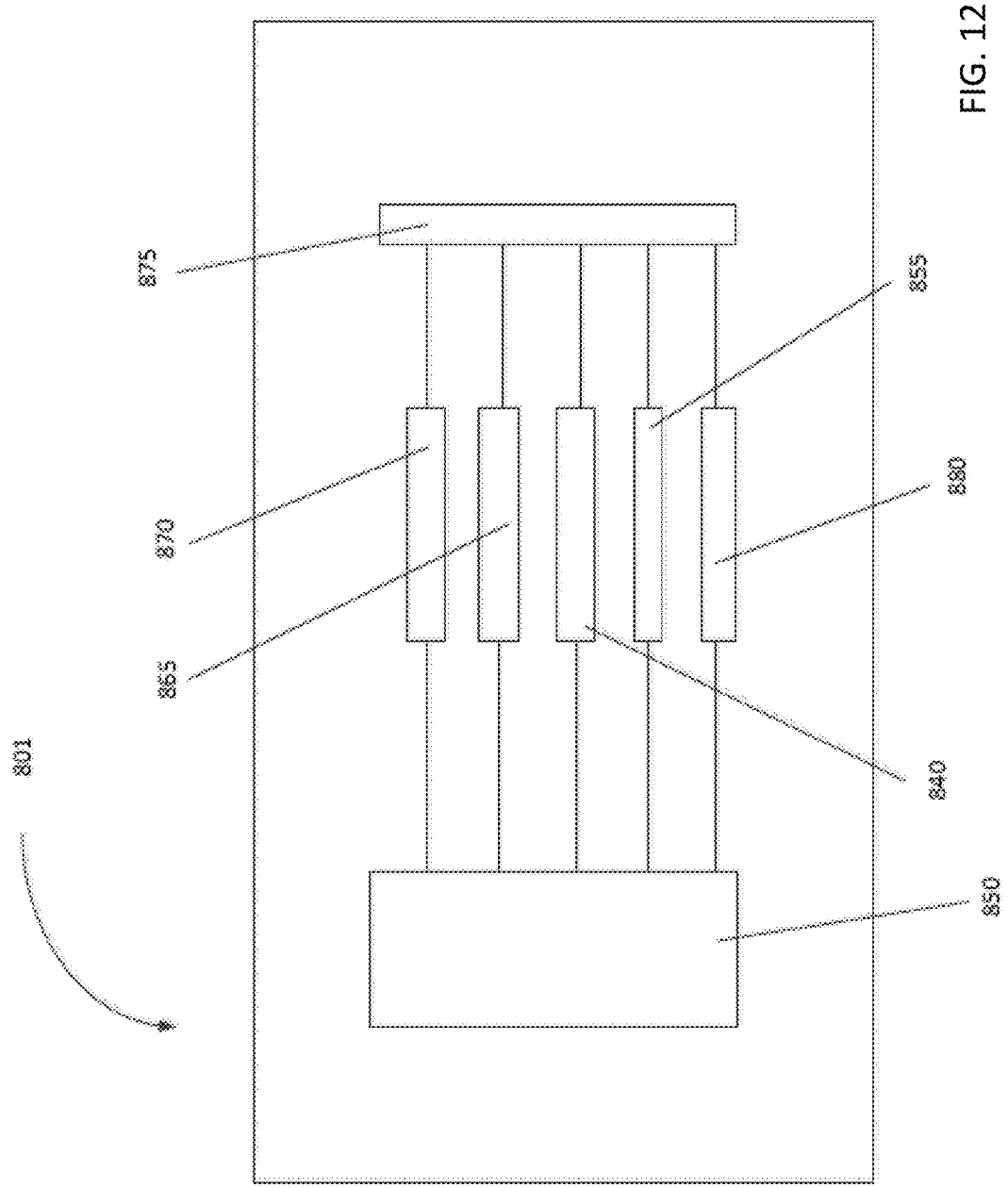
FIG. 12 is an illustration of a portable computing device that may be part of the system.

FIG. 11 may be a high level illustration of some of the elements a sample computing system such as a server that may be physically configured to implement the method, system and various sub-systems each of which may require their own server. The computing system may be a dedicated computing device 841, a dedicated portable computing device 801, an application on the computing device 841, an application on the portable computing device 801 or a combination of all of these. FIG. 12 may be a high level illustration of a portable computing device 801 communicating with a remote computing device 841 but the application may be stored and accessed in a variety of ways. In addition, the application may be obtained in a variety of ways such as from an app store, from a web site, from a store WiFi system, etc. There may be various versions of the application to take advantage of the benefits of different computing devices, different languages and different API platforms.

In one embodiment, a portable computing device 801 may be a device that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801 including the force of an input In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 841 or may be through a communication network 102 such as cellular service, through the Internet, through a private network, through Bluetooth, etc. FIG. 12 may be a simplified illustration of the physical elements that make up a portable computing device 801 and FIG. 13 may be a simplified illustration of the physical elements that make up a server type computing device 841.

FIG. 12 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have volatile memory 865 and non-volatile memory 870. It may have GPS capabilities 880 that may be a separate circuit or may be part of the processor 850. There also may be an input/output bus 875 that shuttles data to and from the various user input devices such as the microphone 806, the camera 808 and other inputs 802, etc. It also may control communicating with the networks, either through wireless or wired devices. Of course, this is just one embodiment of the portable computing device 801 and the number and types of portable computing devices 801 is limited only by the imagination.

As a result of the system, users may be able to identify experiences they never knew existed. Further, merchants may be better at identifying customers with interest in their goods or services. The system is more than just speeding a process but uses a computing system to achieve a new and better outcome for users and merchants.

The physical elements that make up the remote computing device 841 may be further illustrated in FIG. 13. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs 802, etc. The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving user experience in finding and experiencing actionable events. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A non-transitory, processor-implemented method for targeting an actionable list with actionable content comprising processor-executable instructions for:
   recognizing that a unique user is visiting the network location;
   storing identification data on the user;
   displaying actionable items of an actionable list to a user;
   displaying decision enhancing metrics related to the actionable item to the user comprising at least one of:
      a) how many other individuals have completed each actionable item;
      b) how many additional individuals plan to complete each actionable item, or
      c) how many of their correlated relationships have completed or plan to complete that actionable item;
   offering to the user to add one or more actionable items in the actionable list to the personable actionable list in a user profile;
   in response to the user selecting to add one or more actionable item to the personable actionable list,
      storing the selected items of the actionable list in the personable actionable list in a memory in relation to the user;
   allowing the user to indicate additional details regarding the selected actionable item;
   storing the selected actionable items and additional details in a memory in relation to the user;
   allowing access to the selected actionable item and additional details stored in the memory to additional users that have permissions to view the selected item and additional details of the user; and
   determining correlated relationships by:
      analyzing the additional item and additional detail for the individuals;
      determining if the addition item and additional detail for the individual are over a similarity threshold of an additional user; and
      in response to determining that that addition item and additional detail for the individual are over a similarity threshold of an additional user, storing that the users are correlated users.

2. The method of claim 1, wherein additional items comprise indicating at least one of:
   want to do it;
   plan to do it;
   do not want to do it; and
   did it.

3. The method of claim 2, wherein additional items comprise at least one of:
   when a selected item was completed or will be completed;
   with whom a selected item was completed or will be completed; and
   a rating of the selected item.

4. The method of claim 1, wherein an actionable item comprise a distinct experience items that can be at least one of visited, purchased, or otherwise completed either immediately or at a later date.

5. The method of claim 1, further comprising recognizing that a unique user is visiting the network location by receiving a user id, comparing it to a list of known ids and determining if the user id is known.

6. A non-transitory, processor-implemented method for extracting data of interest from content on a network location comprising processor-executable instructions to:
   load content from a network location (web page) in a computer executable display application (web browser);
   execute computer executable instructions (extension) on content from a network location (web page) comprising instructions to scan the content for actionable list;
   in response to a actionable list being located, search the actionable list for actionable items;
   in response to actionable items being found, executing computer executable instruction for presenting an add item option for each actionable item to users;
   in response to a user selecting to adding an item, add the selected item to a personal list which is stored in a memory;
   allow user to indicate additional details regarding the selected item;
   store the additional items in the personal list which is stored in the memory; and
   determine correlated relationships comprising:
      analyzing the additional item and additional detail for the individuals;
      determining if the addition item and additional detail for the individual are over a similarity threshold of an additional user; and
      in response to determining that that addition item and additional detail for the individual are over a similarity threshold of an additional user, storing that the users are correlated users.

7. The method of claim 6, wherein the selected item and additional details stored in the memory are available to additional users that have permissions to view the selected item and additional details of the user.

8. The method of claim 6, wherein additional items comprise indicating at least one of:
   want to do it;
   plan to do it;
   do not want to do it; and
   did it.

9. The method of claim 6, wherein additional items comprise at least one of:
   when a selected item was completed or will be completed;
   with whom a selected item was completed or will be completed; and
   a rating of the selected item.

10. The method of claim 6, wherein an actionable item comprise a distinct experience items that can be at least one of visited, purchased, or otherwise completed either immediately or at a later date.

11. The method of claim 6, further comprising recognizing that a unique user is visiting the network location by receiving a user id, comparing it to a list of known ids and determining if the user id is known.

12. A non-transitory, processor-implemented method to review content of network locations for actionable lists and items comprising:
   loading content from a network location;
   analyzing the content for an actionable list;
   in response to a actionable list being located, analyzing the actionable list for actionable items that make up actionable list;
   in response to determining that the actionable list and actionable items are not duplicates, storing the actionable list and the actionable items in a memory receiving queries related to the actionable list and actionable items, in response to a query being scoring over a threshold of similarity, communicating the actionable lists or actionable items that scored over the threshold, allowing at least one of the actionable list or actionable items to be selected, in response to the actionable list or the actionable item being selected, adding the actionable item to a list which is store in a memory;

allowing the additional details to be indicated regarding the actionable item;

storing the additional actionable items in memory; and determining correlated relationships comprising:

analyzing the additional actionable item and additional detail for the individuals;

determining if the addition actionable item and additional detail for the individual are over a similarity threshold of an additional user; and in response to determining that that addition actionable item and additional detail for the individual are over a similarity threshold of an additional user, storing that the users are correlated users.

13. The method of claim 12, further comprising storing the additional actionable items in a memory for a specific user.

14. The method of claim 12, wherein the selected item and additional details stored in the memory are available to additional users that have permissions to view the selected item and additional details of the user.

15. The method of claim 12, wherein additional items comprise indicating at least one of:

want to do it;

plan to do it;

do not want to do it; and did it.

16. The method of claim 12, wherein additional actionable items comprise at least one of:

when a selected actionable item was completed or will be completed;

with whom a selected actionable item was completed or will be completed; and a rating of the selected actionable item.

17. The method of claim 12, further comprising recognizing that a unique user is visiting the network location by receiving a user id, comparing it to a list of known ids and determining if the user id is known.

\* \* \* \* \*